April 4, 1967    A. T. SUTOR ET AL    3,312,068
HORIZONTAL FLOW THRUST CHAMBER
Filed Dec. 5, 1960    3 Sheets-Sheet 1

INVENTORS
ALOIS T. SUTOR
THOMAS E. COWELL
ROBERT S. KRAEMER
BY *Lowell J. Turner*
AGENT April 4, 1967  A. T. SUTOR ET AL  3,312,068
HORIZONTAL FLOW THRUST CHAMBER Filed Dec. 5, 1960  3 Sheets-Sheet 3

INVENTORS
ALOIS T. SUTOR
THOMAS E. COWELL
ROBERT S. KRAEMER

BY

AGENT

United States Patent Office 3,312,068
Patented Apr. 4, 1967

3,312,068
HORIZONTAL FLOW THRUST CHAMBER
Alois T. Sutor, Thomas E. Cowell, and Robert S. Kraemer, Woodland Hills, Calif., assignors to North American Aviation, Inc.
Filed Dec. 5, 1960, Ser. No. 73,726
3 Claims. (Cl. 60—258)

This invention relates to reaction motor thrust chambers, and more particularly to thrust chamber structure whereby extremely short lengths are achievable.

The thrust chamber described herein is primarily adaptable to rocket engine applications and is described as so applied.

Rocket engine thrust chambers of the prior art have generally been constructed to include a cylindrical combustion chamber, a constricted throat provided at an open end of the combustion chamber and a divergent nozzle attached to and extending from the throat structure in either a conical or a bell-shaped section. These components are disposed in axial alignment and, therefore, require a relatively great length to accomplish their design function. Only approximately 20 to 30 percent of the total achievable thrust is produced upon the diverging nozzle walls, the balance being produced over the combustion chamber area. Thus the physical arrangement of the components and the generally axial manner in which the combustion gases are discharged from the combustion chamber for expansion in the nozzle in the prior art devices prevent thrust chamber shortening to any material degree. In most instances, the length of such chambers is further extended by the necessity of mounting the propellant pumps in axial alignment with the thrust chamber adjacent the combustion chamber closed end. Therefore, the thrust-to-length ratio of engines incorporating these thrust chambers is, by necessity, relatively low. Such ratios invariably require structural supports and related hardware of a proportionate weight. These characteristics are detrimental to ultimate vehicle requirements, particularly when the rocket engine is applied to a missile wherein missile range and payload depend upon the weight of the vehicle and propellants carried for the production of usable thrust. Structural weight is an extremely critical factor in such cases since an excess thereof has a direct and adverse effect upon missile capabilities.

More recently developed thrust chambers, e.g. (a) the type commonly referred to as the spike nozzle wherein an annular combustion chamber is provided and nozzle walls curve symmetrically from the combustion chamber to converge at a remote point upon the thrust chamber axis, (b) the Expansion-Deflection Thrust Chamber of patent application, Ser. No. 27,128, filed May 5, 1960, and now abandoned, (c) the Reverse Flow Thrust Chamber of patent application, Ser. No. 27,126, filed May 5, 1960, now Patent No. 3,173,250, granted Mar. 6, 1965, and (d) Thrust Chamber and Turbopump Assembly of patent application, Ser. No. 27,705, filed May 9, 1960, now Patent No. 3,216,191, granted Nov. 9, 1965, have succeeded in materially reducing the length of rocket engine thrust chambers and in increasing the thrust-to-length ratio. The disclosures of patent applications (b), (c), and (d) above, assigned to the common assignee of this application, are hereby incorporated in this application by reference to provide detailed disclosure of various of the components described herein. Further reductions in overall engine length, with a resultant thrust-to-length ratio increase, are provided by the present invention. The feasibility of thrust chamber segmenting for purposes to be described is also enhanced.

It is an object of this invention to provide a high thrust-to-length ratio thrust chamber capable of being throttled in segments for thrust vector control.

Another object of this invention is to provide a thrust chamber including segments independently removable for repair purposes.

A further object of this invention is to provide a thrust chamber inherently including a minimum of detrimental structureal loading characteristics.

Still another object is to provide a thrust chamber having superior packaging characteristics.

Yet another object is to provide a thrust chamber wherein the propellant storage tank of a missile is utilized as the thrust chamber nozzle wall.

Other objects of invention will become apparent from the following description taken in connection with the following drawings, in which.

The thrust chamber of this invention in its most basic form is comprised of a flattened annular combustion chamber including an injector upon its inner periphery for the injection of propellants essentially radially outward into the combustion chamber. Combustion products are also discharged from the combustion chamber in a radially outward direction. A nozzle wall attached to a forward side of the combustion chamber extends outward and curves rearward into a more nearly axial direction for the directing of combustion gases in a rearward direction.

This general configuration results in what is termed herein as a horizontal flow thrust chamber since the combustion gases flow essentially horizontally from the instant of their production until turned by the nozzle walls exteriorly of the combustion chamber proper. The combustion chamber, whether it be one continuous chamber or segmented, is oriented in basically a horizontal plane. Segmentation of the combustion chamber and/or nozzle is provided in certain configurations for thrust vector control, throttling, and repair purposes.

Figure 1:
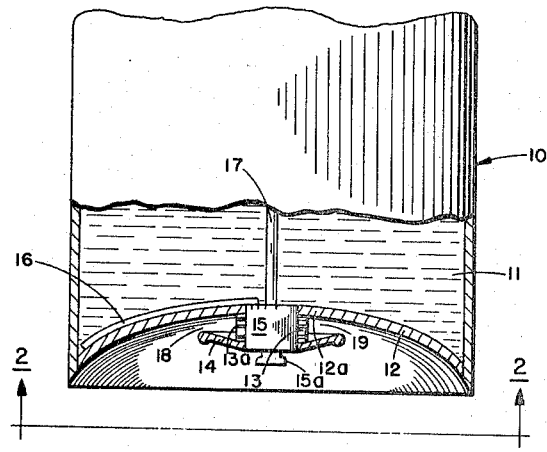
FIG. 1 is a schematic partial cutaway of a basic non-segmented configuration of the present invention adapted as a portion of a missile tank.

The embodiment of FIG. 1 is illustrative of a missile 10 adapted to be propelled by a rocket engine. Missile 10 includes a first propellant tank 11 and a second propellant tank (not shown) for containment of oxidizer and fuel propellant components. The rocket engine adapted for propelling the missile is integrated with an after-portion of tank 11. Such a rocket engine provides a basic and elementary embodiment of the present invention. Tank wall 12 at the after end of propellant tank 11, in this instance, also serves as a nozzle wall for the rocket engine. It is suitably curved between its central portion and its outer and after extremities for efficient combustion product turning and expansion, the curvature being dependent upon the combustion chamber and missile diameter and in accordance with accepted design practices. The nozzle contour in an embodiment of this character is preferably sloped rather gently from the combustion chamber throat (to be later defined) to the nozzle extremities and so as to direct exhaust gases in a stream approximately 0 to 20 degrees outward from the missile center line. It is preferable that the nozzle extend over the entire missile diameter. This eliminates the necessity for shielding or insulating tank portions located radially outward from the nozzle extremities.

A generally ring-shaped injector 13, having injector orifices 13a, has a forward side attached centrally to nozzle wall 12 and extends rearwardly. Injector 13 may be constructed in accordance with techniques well known and practiced in the injector art. A typical injector is described in patent application (d) above, wherein orifices 19 and 20 correspond generally to the reoriented orifices 13a shown and described herein. Injector 13 is adapted to accept propellant discharged by a pump 15 and inject the propellant outward. Pump 15 may be of the design shown in patent application (d) above and be driven by a gas generator 15a, shown in such prior application. While pump 15 is illustrated as being located centrally of injector 13, it is to be understood that it may be otherwise positioned, such as interiorly of propellant tank 11. First propellant transfer line 16 leads from a lower extremity of tank 11 to pump 15, the open end of line 16 being so positioned as to drain trapped propellant from the tank extremity. Propellant transfer line 17, illustrated representatively, transfers a second propellant in the case of a bipropellant system from an upper propellant tank (not shown) to the pump.

A central portion 12a of wall 12 acts as one combustion chamber wall. A second combustion chamber wall 14 is attached to the rearward extremity of injector 13. Disclike wall 14 extends radially outward in a converging relation to wall portion 12a. A throat 18 is defined between the outer extremity of combustion chamber wall 14 and the region of demarcation between nozzle wall 12 and central wall portion 12a. Propellants are injected by injector 13 into combustion chamber 19, defined intermediate of walls 12 and 14 and injector 13, where they are mixed and combusted. Combustion may be initiated by providing hypergolic propellants or having a conventional igniter in the chamber 19. The combustion products are compressed as they approach throat 18. They are then expanded through throat 18 into the volume bounded by nozzle wall 12, where they are redirected and their useful energy is extracted for achieving propulsion.

Walls 12 and 14 may be conventionally cooled by regenerative cooling means, coated with heat resistant and/or ablative materials, or other conventional methods may be applied to facilitate heat resistance. However, the utilization of the rearward tank wall as a portion of the nozzle obviates other heat transfer or heat sink requirements to at least a material degree since heat wall 12 is transmitted freely into the propellant contained within tank 11. The placement of propellant pump inlet lines 16, or multiple lines, at either the inner or outer periphery of wall 12 also serves to flow propellant across the inner wetted wall prior to being transmitted to the pump. This further enhances heat transfer.

It will be obvious to those having experience in the rocket engine art that thrust chamber configurations similar to that described with respect to FIG. 1, but not integral with the missile tank wall, may readily be constructed without departing from the basic inventive concept.

Figure 2:
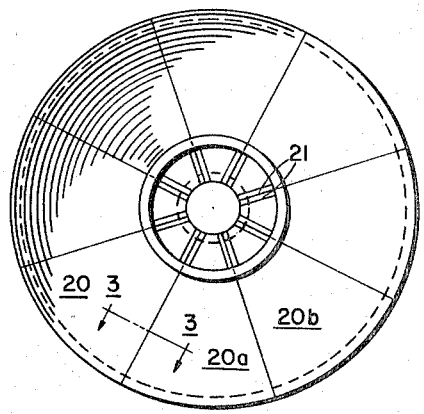
FIG. 2 is a view of a thrust chamber taken representatively along line 2—2 of FIG. 1 and illustrating a segmented embodiment.
Figure 3:
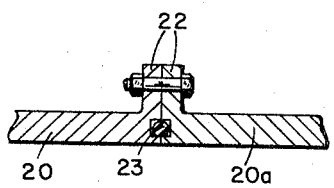
FIG. 3 is a typical section of a flanged connection of the FIG. 2 segmented chamber as taken along line 3—3 of FIGURE 2.

The FIG. 2 end view has been modified to show a segmented version of the FIG. 1 thrust chamber. A plurality of essentially pie-shaped segments are joined at their peripheries so as to complete a circular pattern. The peripheral attachments may be accomplished in any conventional manner. FIG. 3 illustrates a typical joint configuration. Thrust chamber segments 20, 20a, 20b, etc. include flanges upon the outer peripheries of the nozzle wall and the rearward combustion chamber wall. Flanges 21, shown in FIG. 2, and flanges 22, shown in FIG. 3, representatively illustrate typical flanges. They may be bolted, welded, or otherwise joined to facilitate assembly. In any event, it is necessary that a gas-tight seal between segments be provided. A separate seal 23 (FIG. 3), fabricated from a high temperature resistant material, may be provided for this purpose.

Beneficial results from utilization of the segmented thrust chamber embodiment include removability of one or more segments for repair or replacement purposes in the event of burn-out or other structural deterioration; and the ability to provide thrust vector control by independently throttling the propellant supply to various of the thrust chamber segments. In achieving such throttling, propellant fed into the various injector segments is preferably controlled by using conventional valve means in separate lines leading from the pump to the injector segments. The valves are actuated responsive to signals from a control circuit. Such a control circuit may be of standard construction not within the purview of this invention.

Figure 4:
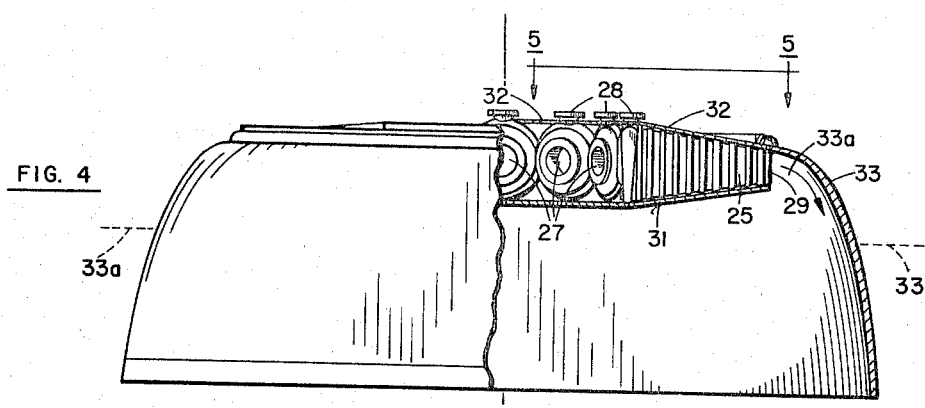
FIG. 4 is an elevational view in partial section of a second segmented configuration wherein the segments are individual units cooperatively integrated into a single thrust chamber.
Figure 5:
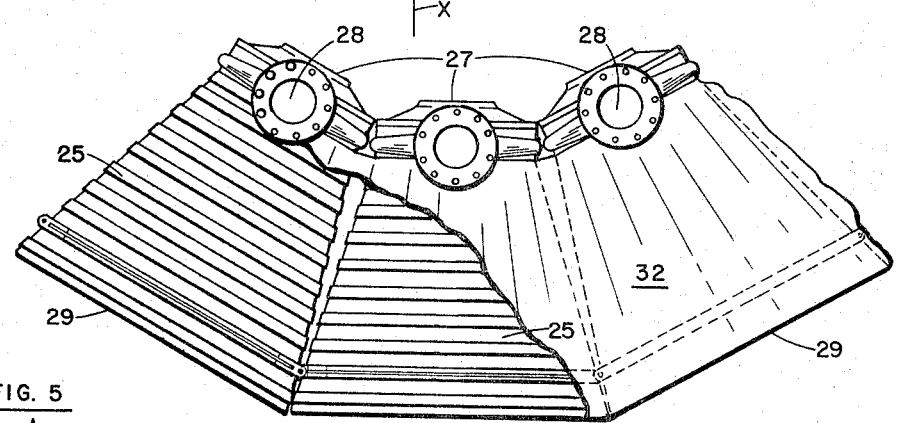
FIG. 5 is an enlarged and rotated partial cutaway of the FIG. 4 thrust chamber as viewed essentially along line 5—5 of FIGURE 4.
Figure 6:
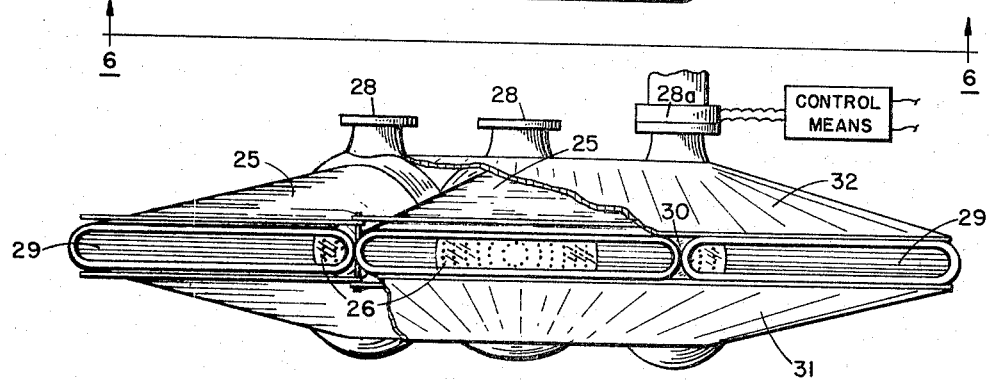
FIG. 6 is a view of the FIG. 5 segments taken essentially radially inward along line 6—6 of FIGURE 5.

In an advanced segmentation configuration, individual combustion chambers are provided in a radial array about an axis indicated by the letter X in FIG. 4. A typical embodiment of such segmentation is illustrated in FIGS. 4–6. A series of individual combustion chambers 25 are there assembled in an annular fashion. When viewed from the forward or rearward direction (FIG. 5), each chamber 25 is generally rhombic-shaped in outline. A flat plate injector 26 (other injector configurations may be substituted) is positioned in each chamber 25 (FIG. 6) adjacent port 27 and is adapted to receive propellants from ports 27 and 28. A conventional valve 28a may be attached to one or more of these ports and actuated by a conventional control means for accomplishing the above-mentioned thrust vector control. The combustion chamber is progressively flattened as its outer extremity is approached. A slot-shaped throat 29 through which combustion products are radially directed is defined at the chamber extremity. Chambers 25 are at least partially covered by gas-sealing walls 30 and 31 to prevent passage of combustion gases forwardly from between the chambers. Alternatively or additionally, wall 32 may be provided for the same purpose. A nozzle wall 33 is attached to the outer and forward extremity of the combustion chamber 25 is generally rhombic-shaped in outline. A flat ing combustion gases exiting from throat 29 to approximately an axially rearward direction. Again, the exact curvature is dependent upon design criteria for the particular engine. Since a prime purpose of the present invention is to provide a minimum length thrust chamber structure, it is preferably that, in most instances, nozzle 33 be foreshortened to a position approximating that indicated by dotted line 33a in FIG. 4.

Figure 7:
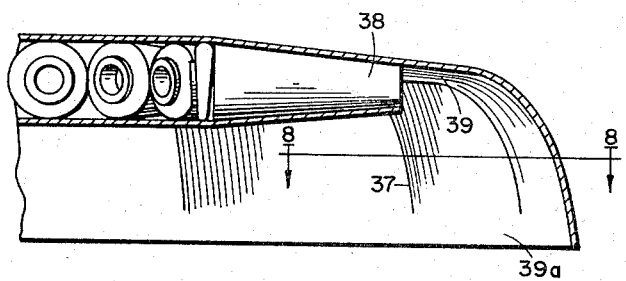
FIG. 7 is a partial section of a segmented thrust chamber including nozzle scallops.
Figure 8:
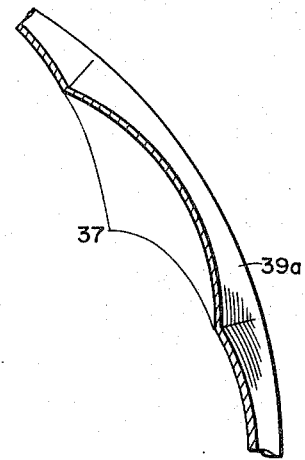
FIG. 8 is a section taken along lines 8—8 of FIG. 7.

The shape of combustion chamber 25 may be varied to meet particular requirements. For example, it is sometimes desirable that the chamber be shaped as a truncated cone. In such case (FIG. 7), the smaller end defines the gas-discharge throat. When such configuration is utilized, the nozzle may be scalloped, as at 37 such that gases are discharged from the individual chambers 38 into the most concave portions 39 of the scallops. The scallops preferably blend evenly into a smooth wall 39a as the nozzle wall curvingly extending as a portion of said first initially separate the throat discharge from the individual segments and to give better expansion and directional control to the exiting gases.

Structural support members of a conventional nature, e.g., ball bearing type yokes, may be secured around the combustion chambers for maintaining their relative positions within the assembly.

Through the utilization of the above-described individual and separate combustion chambers ease of repair is further enhanced and a universally usable chamber for fabricating engines of various thrust rating is achieved.

The number of chambers utilized for a particular mission is varied, dependent upon the thrust requirements. Such segmentation of combustion chambers also provides adaptability for use of prior developed components. For example, injectors from existing conical or bell-shaped thrust chambers may be incorporated directly without major modification.

Prior art rocket engines utilizing annular combustion chambers are faced with structural loading characteristics of a detrimental nature since compressive loads acting radially inward tend to cause material buckling. Utilization of the segmented concept of FIGS. 4-6 virtually eliminates such structural problems by eliminating the annular structure in which such stresses are inherent, yet this concept maintains the desirable radially outward combustion gas discharge. Additionally, the above noted thrust vector control and thrust chamber length reduction are achievable.

Although the invention has been described in detail, it is to be clearly understood that the same is by way of illustration and example only, and is not to be taken by way of limitation, the spirit and scope of this invention being limited only by the terms of the appended claims.

We claim:

1. A rocket engine thrust chamber including a combustion chamber comprising a cylindrical shaped propellant injector facing radially outwardly from the thrust axis of said chamber, means for injecting propellants radially outward through orifices in said injector and directly into said combustion chamber, said injector having first and second edges at opposite extremities thereof, a first continuous wall connected to said first edge and a second continuous wall connected to said second edge, said walls extending radially and convergingly from said injector, means upon said walls defining a throat at an outer extremity of said second wall, said walls and said injector cooperatively defining an annular combustion chamber therebetween, a combustion product discharge nozzle wall curvingly extending as a portion of said first wall into a direction radially surrounding said combustion chamber, and said first wall being a portion of a propellant storage tank of a vehicle to be propelled.

2. A rocket engine thrust chamber having a longitudinal axis comprising a plurality of individual combustion chambers, each of said combustion chambers including wall means parallel with said longitudinal axis, said wall means having propellant injection means and walls extending from said wall means and each of said chambers terminating in an elongated, slot-shaped throat radially opposite said wall means and said injection means, said chambers attached together in a relatively short, radial array about said longitudinal axis, said throats being directed radially outward, a nozzle wall attached to said chambers adjacent said throats and including a portion curved to substantially surround said combustion chambers, said portion ultimately extending in a direction approximating that of said axis for redirecting products discharged from said combustion chambers, sealing means disposed around said chambers whereby combustion products are prevented from flowing between said chambers, an interior surface of said nozzle wall including a plurality of concave scalloped sections, and said combustion chambers being oriented to discharge combustion products into said scalloped sections for expansion and redirection of said products.

3. In combination, a missile vehicle and a rocket engine integrated therein, said vehicle including a propellant tank having an aft wall section, a longitudinally extending cylindrical shaped radially outwardly facing injector extending aft from a central portion of said wall section, said injector having means forming orifices therein for radially injecting a propellant from said cylindrical shaped injector, a wall member extending radially from an aft end of said injector and forming with said wall section an annular combustion chamber extending to a region intermediate of said central portion and the outer periphery of said wall section, said wall section having a curved section peripherally outwardly of said intermediate region to redirect flow of combustion gases from a radial direction to a rearward direction.

References Cited by the Examiner

UNITED STATES PATENTS

| | | | |
|---|---|---|---|
| 1,288,122 | 12/1918 | Mowry | 239—523 |
| 2,496,710 | 2/1950 | Goddard | 60—35.6 |
| 2,633,700 | 4/1953 | Goddard | 60—35.6 |
| 2,726,510 | 12/1955 | Goddard | 60—35.54 |
| 2,850,250 | 9/1958 | Smith | 60—39.37 X |
| 2,856,755 | 10/1958 | Szydlowski | 60—39.36 |
| 2,918,791 | 12/1959 | Greiner | 60—39.48 X |
| 2,990,123 | 6/1961 | Hyde | 239—524 X |
| 3,094,072 | 6/1963 | Parilla | 60—35.55 X |
| 3,112,612 | 12/1963 | Adamson et al. | 60—35.6 |
| 3,151,446 | 10/1964 | Parilla | 60—35.6 |

FOREIGN PATENTS

| | | |
|---|---|---|
| 910,217 | 1/1946 | France. |
| 1,112,620 | 11/1955 | France. |
| 1,229,596 | 3/1960 | France. |
| 1,230,372 | 3/1960 | France. |
| 729,133 | 12/1942 | Germany. |

OTHER REFERENCES

Astronautics, "Plug-Nozzle Flexibility," September 1960, page 52.

MARK NEWMAN, *Primary Examiner.*

JULIUS E. WEST, SAMUEL FEINBERG, ABRAM BLUM, SAMUEL LEVINE, *Examiners.*

L. J. CLARKE, S. N. GARBER, D. HART,
*Assistant Examiners.*